(12) United States Patent
Gove

(10) Patent No.: US 10,671,548 B2
(45) Date of Patent: Jun. 2, 2020

(54) MEMORY INITIALIZATION DETECTION SYSTEM

(71) Applicant: Oracle International Corporation, Redwood Shores, CA (US)

(72) Inventor: Darryl J. Gove, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 89 days.

(21) Appl. No.: 15/972,990

(22) Filed: May 7, 2018

(65) Prior Publication Data

US 2018/0253389 A1 Sep. 6, 2018

Related U.S. Application Data

(62) Division of application No. 14/868,308, filed on Sep. 28, 2015, now Pat. No. 9,965,402.

(51) Int. Cl.
| | |
|---|---|
| *G06F 12/00* | (2006.01) |
| *G06F 3/06* | (2006.01) |
| *G06F 12/14* | (2006.01) |
| *G06F 12/0875* | (2016.01) |
| *G06F 12/0888* | (2016.01) |

(52) U.S. Cl.
CPC ........ *G06F 12/1416* (2013.01); *G06F 3/0619* (2013.01); *G06F 3/0659* (2013.01); *G06F 3/0673* (2013.01); *G06F 12/0875* (2013.01); *G06F 12/1425* (2013.01); *G06F 12/0888* (2013.01); *G06F 2212/1024* (2013.01); *G06F 2212/1032* (2013.01); *G06F 2212/1052* (2013.01); *G06F 2212/466* (2013.01); *G06F 2212/60* (2013.01)

(58) Field of Classification Search
CPC ...... G06F 12/00; G06F 12/1416; G06F 13/00; G06F 3/0619; G06F 3/0659; G06F 3/0673
USPC ................................. 711/100, 117, 118, 154
See application file for complete search history.

(56) References Cited

U.S. PATENT DOCUMENTS

| | | | |
|---|---|---|---|
| 5,450,563 A | 9/1995 | Gregor | |
| 5,530,839 A | 6/1996 | Komoto | |
| 5,845,331 A | 12/1998 | Carter et al. | |
| 6,745,306 B1 | 6/2004 | Willman et al. | |
| 8,219,756 B2 * | 7/2012 | Whalley | G06F 12/0897 711/122 |
| 2003/0046493 A1 * | 3/2003 | Coulson | G06F 12/122 711/118 |
| 2003/0120868 A1 | 6/2003 | Royer, Jr. et al. | |

(Continued)

*Primary Examiner* — Tuan V Thai
(74) *Attorney, Agent, or Firm* — Kowert, Hood, Munyon, Rankin & Goetzel, P.C.

(57) ABSTRACT

In some embodiments, a memory initialization detection process includes detecting a read instruction of a program, where the read instruction addresses a particular memory location, and where data corresponding to the particular memory location is cached in a particular cache line of a memory cache. The memory initialization detection process further includes determining, based on metadata stored in the memory cache, that a section of the particular cache line does not store valid data of the program. The memory initialization detection process further includes obtaining validity data from the section of the particular cache line. The memory initialization detection process further includes determining, based on the validity data, whether the read instruction is authorized to proceed.

19 Claims, 13 Drawing Sheets

(56) References Cited

U.S. PATENT DOCUMENTS

| | | |
|---|---|---|
| 2004/0078536 A1 | 4/2004 | Chen |
| 2005/0081020 A1 | 4/2005 | Volp |
| 2006/0015748 A1 | 1/2006 | Goto et al. |
| 2007/0083711 A1* | 4/2007 | Bradford ............ G06F 12/0893 711/118 |
| 2010/0332716 A1 | 12/2010 | Sheaffer et al. |
| 2015/0169458 A1* | 6/2015 | Purkayastha ....... G06F 12/0811 711/122 |
| 2015/0205721 A1 | 7/2015 | Diestelhorst et al. |
| 2015/0364168 A1* | 12/2015 | Riley ................ G06F 12/0623 711/5 |
| 2016/0154743 A1 | 6/2016 | Pan et al. |
| 2016/0219123 A1 | 7/2016 | Slavicek et al. |
| 2017/0075817 A1 | 3/2017 | Gove |

* cited by examiner

MEMORY INITIALIZATION DETECTION SYSTEM

The present application is a divisional of U.S. application Ser. No. 14/868,308, filed Sep. 28, 2015 (now U.S. Pat. No. 9,965,402); the disclosures of each of the above-referenced applications are incorporated by reference herein in their entireties.

BACKGROUND

Technical Field

This disclosure relates to computing systems, and more particularly, to a memory initialization detection system.

Description of the Related Art

Memory initialization errors occur when a program attempts to access a memory location that has not been previously written to. One example of such an error occurs when a computer program allocates a memory location and then attempts to read from the allocated memory location prior writing any values at that memory location. When the value retrieved from the memory location is later used by the computer program, it may lead either to a program crash or to unexpected program behavior. Some programming languages (for example, C and C++) include features such as explicit memory management and pointer arithmetic. These features allow development of efficient applications and system software. However, when a computer programmer incorrectly uses these features, memory initialization errors may occur.

A computer programming language may be characterized as "type safe" when the language does not permit a computer programmer to use a value as a data type to which it does not belong. For example, a type safe programming language does not allow conversion of an integer variable to a pointer value. The C programming language is one example of a "type unsafe" language due to casting, particularly the casting of pointers to void pointers and back. The C++ programming language includes most of the C programming language as a subset. Therefore, the C++ programming language inherits the "type unsafe" property.

A computer programming language may be characterized as "memory safe" when the language allows programs to release a portion of memory when it is determined the portion of memory is unused for the remainder of the program evaluation. A programming language that is "memory unsafe" may cause security vulnerabilities with random-access memory (RAM) access, such as buffer overflows and dangling pointers. Programming languages, such as C and C++, that support arbitrary pointer arithmetic, casting, and deallocation are typically "memory unsafe." Some high-level programming languages are memory safe due to disallowing pointer arithmetic and casting, and enforcing tracing garbage collection. However, programming efficiency may be reduced.

When a memory initialization error is detected, precise identification and/or prevention of a memory access instruction that caused the error and the associated program state may be very helpful to application developers (e.g., for debugging purposes).

SUMMARY

Systems and methods for memory initialization detection are contemplated.

In one embodiment, metadata and validity data are utilized as part of execution of a computer program to detect memory access errors (where data is improperly read from an uninitialized memory location) by the computer program. In particular, in one embodiment, during execution of a computer program, a memory cache is used to cache data associated with the computer program. Metadata may be stored at the memory cache to indicate whether various sections of the memory cache store valid data of the computer program. For example, the metadata may indicate whether a particular section of the memory cache that corresponds to a particular memory location allocated for the computer program stores valid data of the computer program (e.g., whether the particular section has been written to by the program to or otherwise initialized). In response to a read instruction of the computer program, if the metadata indicates that a memory location addressed by the read instruction does not store valid data of the computer program, the read instruction may not be allowed to proceed.

In some embodiments, validity data is stored at one or more sections of the memory cache that do not store valid data of the computer program (e.g., sections that cache unallocated or uninitialized memory locations). Similar to the metadata, the validity data may indicate whether various portions of the memory cache store valid data of the computer program. Accordingly, in response to a read instruction of the computer program, if the validity data indicates that a memory location addressed by the read instruction does not store valid data of the computer program, the read instruction may not be allowed to proceed. However, the validity data may utilize more bits of the memory cache than the metadata. The validity data may thus provide more information, information regarding smaller portions of the memory cache, or both, as compared to the metadata. Additionally, because the validity data is stored in sections of the memory cache that do not (but may later) store valid data of the computer program, potentially scarce memory cache resources may be more efficiently utilized, as compared to a system where the validity data is stored in separately allocated memory locations.

These and other embodiments will become apparent upon reference to the following description and accompanying drawings.

Figure 1:
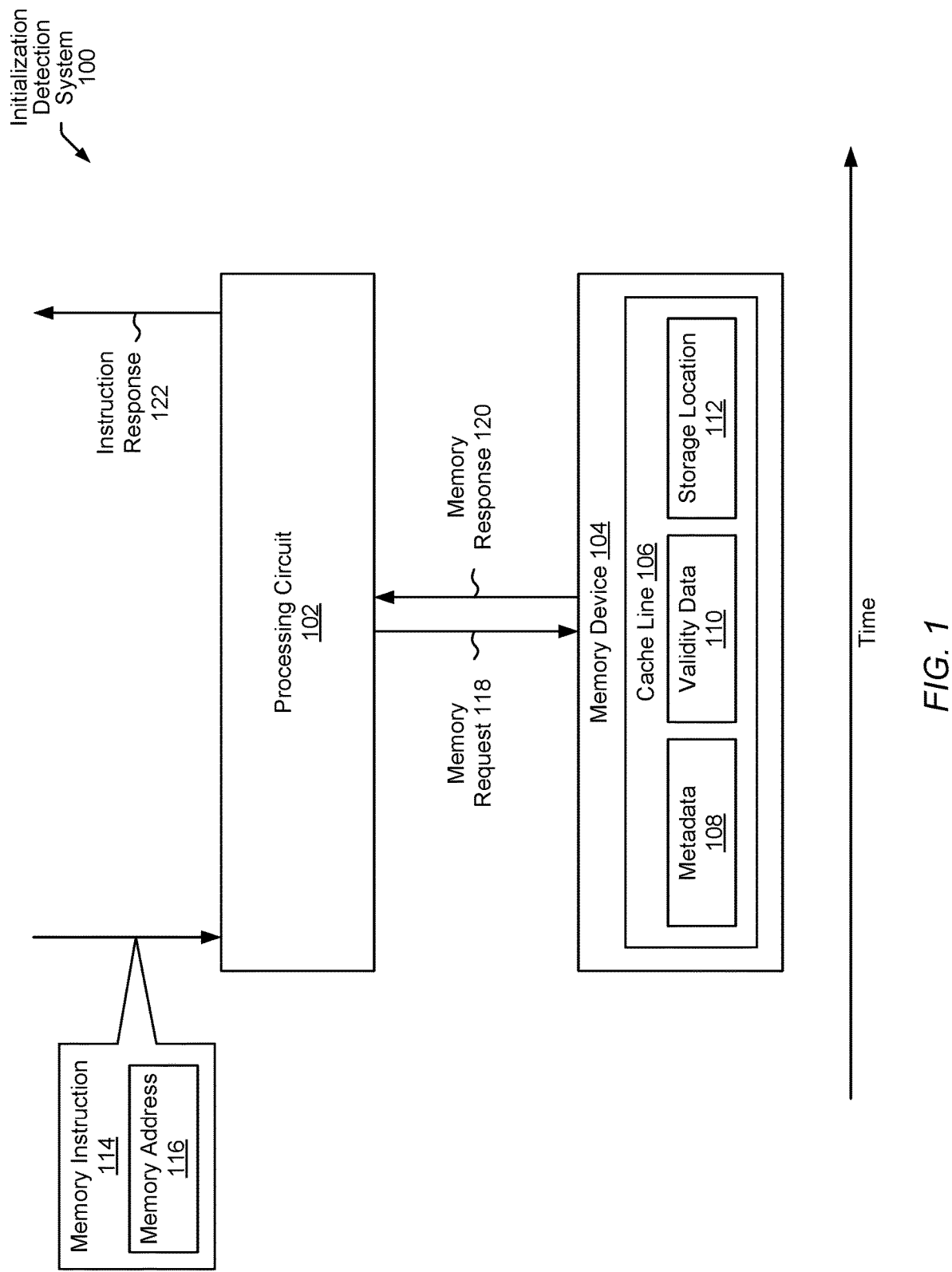
FIG. 1 is a block diagram illustrating one embodiment of an exemplary initialization detection system.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory cache configured to store validity data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software construct such as an application programming interface (API).

The term "configured to" is not intended to mean "configurable to." An unprogrammed FPGA, for example, would not be considered to be "configured to" perform some specific function, although it may be "configurable to" perform that function. The FPGA may also be "configured to" perform that function after it is programmed.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a processor having eight processing elements or cores, the terms "first processing element" and "second processing element" can be used to refer to any two of the eight processing elements, and not, for example, just logical processing elements 0 and 1.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

An initialization detection system is disclosed that may be configured detect and prevent improper memory accesses. One common improper memory access that may be detected and prevented by the initialization detection system is an attempt by a program to read a memory location that has been allocated to the program but that has not yet been written to by the program. Data at the memory location may have an inconsistent, uncontrolled, or unpredictable value, which may cause potential program errors when the value is used by the program. Further, the program may operate differently based on, for example, what value was previously stored at the memory location (e.g., by a different program that has since deallocated the memory location), thus causing inconsistent program behavior that may be difficult for programmers to detect and diagnose.

In one embodiment, such improper memory accesses by a program may, in some cases, be detected and prevented using metadata and validity data that identify whether respective memory locations have been initialized. Although the terms "metadata" and "validity data" both refer to information usable to determine whether valid data of a program is stored in a portion of a cache line, these terms are used differently herein to refer to distinct entities, as described further below. Accordingly, in some embodiments, the metadata, the validity data, or both may be used to determine that a read instruction is addressing a memory location that does not contain valid data of the program. In this manner, the read instruction can be prevented and an error message may be output.

As used herein, "initialized" refers to a condition where a program sets data of a memory location to a known value. For example, a memory location can be initialized using a write instruction from the program. As another example, a memory location can be initialized by the program triggering a hardware process that causes a group of memory locations to store a logical "0" value.

As used herein, "program" is used in a broad sense to refer to a software entity running on an apparatus, and includes, without limitation, processes, threads, and instruction clauses. To illustrate, some of the systems described herein are configured to determine whether a read instruction within a particular program is authorized. This read instruction addresses one or more memory locations. Accordingly, systems disclosed herein are configured to determine whether the one or more memory locations addressed by the read instruction have been initialized by the program that includes the read instruction. If the read instruction addresses a memory location that the program has not initialized, allowing access to that memory location might result in data being received by the program improperly.

As used herein, "valid data of a program" refers to data initialized in response to a request by that program. For example, valid data of a first program can refer to data that has been initialized in response to a write instruction generated by the first program. Data that has been initialized in response to a write instruction of a second, different program, on the other hand, would not be valid data of the first program.

As used herein, the phrase "validity data" refers to data that indicates whether or not memory locations store valid data of a program. "Validity data" might, for example, indicate that a particular memory location stores valid data for a particular program that is executing. But such validity data is not "valid data of the particular program." Although validity data for a particular program includes information that can be read by a read instruction, such data is not initialized by the particular program, and thus does not satisfy the definition of "valid data of a program" set forth above. Instead, in some cases, such data is initialized by one or more memory device management processes that are distinct from, and not controlled by, the program.

As noted above, although the terms "metadata" and "validity data" refer to similar data objects, these terms are used differently herein. Both metadata and validity data describe data about other data. More specifically, both metadata and validity data indicate whether other data, stored within one or more portions of a memory cache that correspond to (e.g., cache data stored at) memory locations allocated to a program, is valid data of the program.

There are differences between these terms as they are used in the present disclosure. First, validity data has a higher degree of granularity than the metadata. Thus, if the metadata divides a portion of a memory cache into 4 sections, corresponding validity data divides the same portion of the memory cache into more than 4 sections. For example, the validity data and the metadata may refer to a same 64 byte cache line. The validity data may indicate whether 64 one byte groups of the cache line store valid data of the program while the metadata may indicate whether 8 eight byte groups of the cache line store valid data of the program.

Second, metadata and validity are stored in different locations. Metadata, as that term is used herein, is stored in one or more storage locations not normally used for program data. For example, metadata may be stored in some embodiments in extra bits of cache lines of a memory cache. Validity data is stored at one or more portions of the cache memory that do not store valid data of the program. In particular, the validity data may be stored at one or more portions of a cache line allocated to the program that do not currently store valid data of the program. Note that validity data does not always exist for every cache line of the memory cache. For instance, when all portions of a given cache line store valid data of a corresponding program, there is no room for validity data to be stored in that cache line; accordingly, validity data does not exist for the given cache line.

Embodiments of the system described herein thus have the capability of storing validity data, which allows for the storage of additional information regarding valid data of a program, as compared to a system that only uses metadata. Because this validity data is more granular than metadata (as those terms are used herein), this paradigm is capable of detecting memory access errors that a metadata-only system may not detect. A specific example of this difference is discussed below with reference to FIG. 5. In other words, embodiments described herein may prevent certain memory accesses that a metadata-only system would not prevent. The embodiments described herein also may make efficient use of scarce memory resources, because the validity data is stored in sections of a memory cache that that do not store valid data of the program. This is particularly true, as compared to a system in which the validity data is stored in separately allocated memory locations. Further, because the initialization detection system utilizes hardware configured to process the memory instruction, detecting a potential improper memory access may occur more quickly, as compared to an initialization detection system that is solely software-based.

This disclosure initially describes, with reference to FIG. 1, functions of various portions of an embodiment of an initialization detection system. Example processes performed by one embodiment of an initialization detection system in response to a read instruction are described with reference to FIG. 2. Specific examples illustrating how one embodiment of an initialization detection system would process a read instruction addressing various memory locations cached by cache lines having various properties are described with reference to FIGS. 3-5. A method performed by an embodiment of an initialization detection system in response to a read instruction is described with reference to FIG. 6. Example processes performed by one embodiment of an initialization detection system in response to a write instruction are described with reference to FIG. 7. Specific examples illustrating how one embodiment of an initialization detection system would process a write instruction addressing various memory locations cached by cache lines having various properties are described with reference to FIGS. 8-11. A method performed by an embodiment of an initialization detection system in response to a write instruction is described with reference to FIG. 12. The techniques and structures described herein, however, are in no way limited to the one or more initialization detection systems described with reference to FIGS. 1-12; rather, this context is provided only as one or more possible implementations. Finally, an exemplary computing system that includes an initialization detection system is described with reference to FIG. 13.

Turning now to FIG. 1, a block diagram of one embodiment of an exemplary initialization detection system 100 is shown. In the illustrated embodiment, initialization detection system 100 includes processing circuit 102 and memory device 104. Memory device 104 includes a plurality of cache lines, including cache line 106. Cache line 106 includes metadata 108, validity data 110, and storage location 112. However, in other embodiments, metadata 108 may be stored outside of cache line 106 (e.g., in another part of memory device 104 or in another memory device). Additionally, FIG. 1 illustrates a series of communications, memory instruction 114, memory request 118, memory response 120, and instruction response 122, which, in the illustrated embodiment, occur sequentially over time. However, in other embodiments, the communications may be sent in other orders, in parallel, or, in some cases, some communications or portions of some communications may not be sent at all. Although initialization detection system 100 is described in terms of a cache memory, in other embodiments, concepts described herein (e.g., metadata and validity data) may be utilized with non-cache memory devices.

In some embodiments, processing circuit 102 is configured, in response to a read instruction (e.g., represented by memory instruction 114), to determine whether to allow the read instruction to proceed based on corresponding metadata, and, in some cases, corresponding validity data. Additionally, processing circuit 102 is configured, in response to a write instruction (e.g., similarly represented by memory instruction 114), to determine whether to modify portions of the memory device 104 other than a memory location addressed by the write instruction (e.g., corresponding metadata and/or corresponding validity data).

Regardless of whether memory instruction 114 is a read instruction or a write instruction, in the illustrated embodiment, processing circuit 102 is configured to generate memory request 118 using memory address 116 from memory instruction 114. Memory request 118 may include memory address 116 (or be a corresponding memory address generated from memory address 116) and may further request corresponding metadata (e.g., metadata 108) and corresponding validity data (e.g., validity data 110) (if corresponding validity data exists). Processing circuit 102 may receive the corresponding metadata, and if in existence, may also receive the corresponding validity data from memory device 104 as part of memory response 120 in response to memory request 118. In some embodiments, as further described below, memory request 118 and memory response 120 may respectively represent several communications or may respectively represent a single communication.

Based on memory response 120, processing circuit 102 may be configured to send instruction response 122 to a portion of a processing pipeline in response to memory instruction 114. Instruction response 122 may confirm successful completion of memory instruction 114 and may, if memory instruction 114 is a read instruction, include data stored at storage location 112. Alternatively, instruction response 122 may indicate a failure of memory instruction 114. Additionally, if memory instruction 114 is a read instruction that processing circuit 102 determined is not authorized to proceed (e.g., based on corresponding metadata and/or validity data), instruction response 122 may include an error message. For example, if memory instruction 114 requests, via memory address 116, a read of storage location 112, and corresponding metadata 108 and/or corresponding validity data 110 indicate that data stored at storage location 112 is not valid data of the program that sent memory instruction, processing circuit 102 may determine that memory instruction 114 is not authorized to proceed and may include an error message in instruction response 122.

In the illustrated embodiment, memory device 104 includes a cache memory configured to cache data corresponding to various memory locations (e.g., other memory locations of memory device 104 or of other memory devices). Memory locations are cached at memory device 104 in response to being allocated for a program. Accordingly, data stored at the cache lines (e.g., cache line 106) may not be valid data relative to that program if the program does not request that the data be initialized when the corresponding memory location is allocated. Memory device 104 is configured to store metadata (e.g., metadata 108) indicating whether various sections of memory device 104 (e.g., cache line 106) store valid data of the program. In some embodiments, when the metadata corresponds to a respective cache line, the metadata is stored at one or more extra bits of the cache line. Memory device 104 is similarly configured to store validity data (e.g., validity data 110) indicating whether various memory locations store valid data of the program. In response to the memory locations being allocated of the program and cached at cache line 106, memory device 104 may be configured to set metadata 108 and validity data 110 to indicate that all portions of the cache line 106 do not store valid data of the program. In response to an indication of initialization (e.g., a write instruction at the memory device 104), the metadata, the validity data, or both may be updated to indicate that corresponding portions of the cache line store valid data of the program.

As used herein, the phrase "extra bits" refers to a set of bits in a memory device that are not ordinarily used to store addressable data. For example, "extra bits" may refer to spare bits of a cache line that are used if a bit in the cache line experiences a hard error such as a hardware failure.

As used herein, "updating" a memory location refers to storing a differing data value at the memory location. Storing the differing value can be performed by modifying only a portion of the data value or by overwriting the entire data value with the differing data value.

In the illustrated embodiment, as shown below with reference to FIG. 5, the metadata may have insufficient storage space to accurately represent whether particular storage locations of memory device 104 store valid data of the program. For example, even if storage location 112 does not store valid data of the program, metadata 108 may indicate that a section of cache line 106 including storage location 112 stores valid data of the program because another storage location in the section (i.e., within storage location 112) stores valid data of the program.

However, in the illustrated embodiment, if sections of memory device 104 do not store valid data of the program, one or more portions of one or more of the sections that do not store valid data of the program may be used to store validity data, which may provide additional information regarding whether the particular storage locations of memory device 104 store valid data of the program. For example, validity data 110 may be used to correctly determine that storage location 112 does not store valid data of the program, thus enabling processing circuit 102 to prevent a read instruction that corresponds to storage location 112 from proceeding. Additionally, because the validity data is stored at a location that does not store valid data of the program, the validity data does not replace valid data of the program and does not use additional storage resources of memory device 104.

In some embodiments, cache line 106 is configured to be dirty with respect to corresponding storage locations in a higher level of a memory hierarchy and thus data stored in cache line 106 may (at least temporarily) differ from data stored at corresponding memory locations. In some embodiments, memory request 118 includes memory address 116. However, in other embodiments, memory request 118 includes an address corresponding to memory address 116. For example, in some cases, memory device 104 is a physically addressable memory device and memory address 116 is a virtual memory address. Accordingly, memory request 118 may include a physical memory address corresponding to memory address 116.

Figure 2:
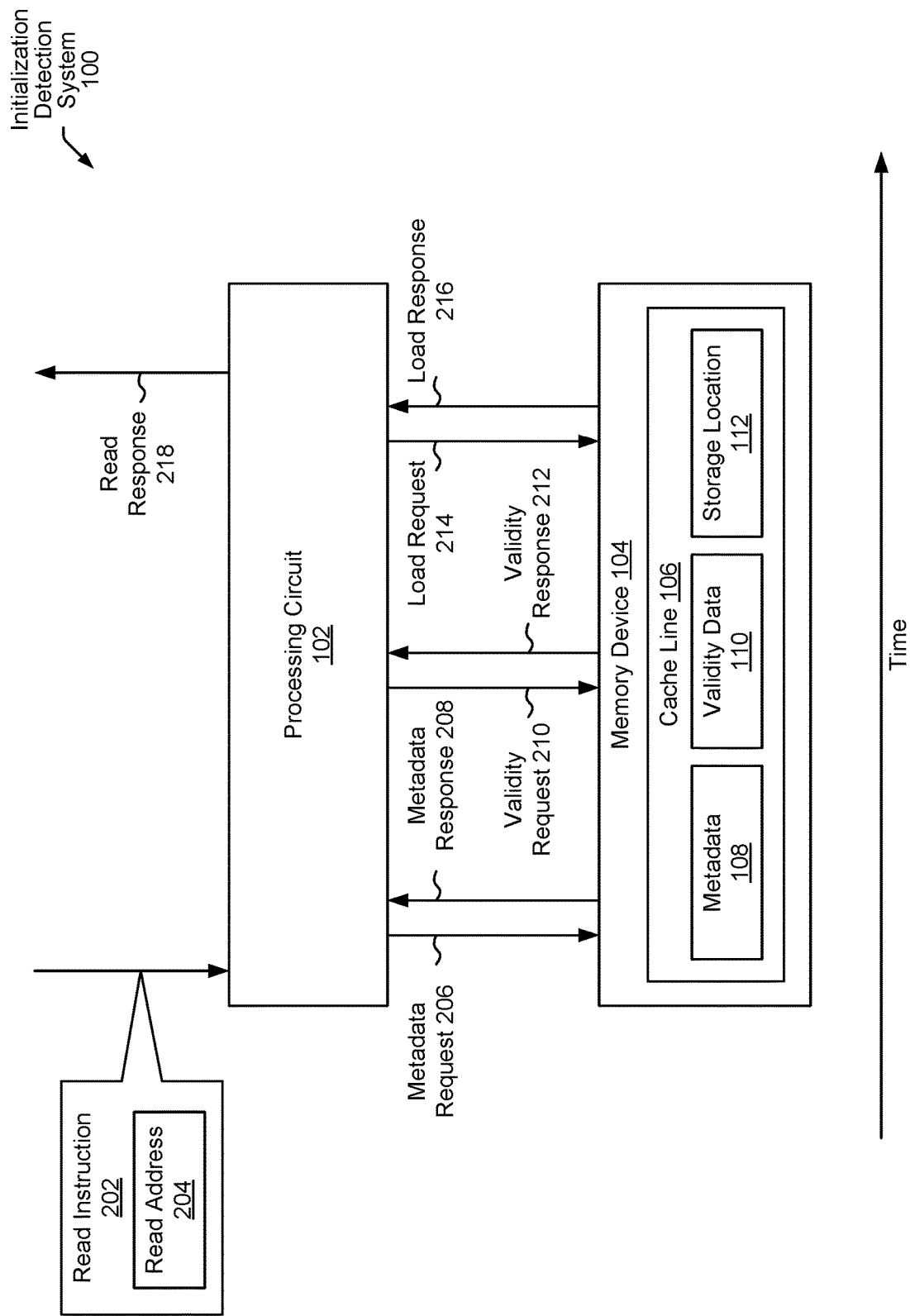
FIG. 2 is a block diagram illustrating example responses to a read instruction by one embodiment of an exemplary initialization detection system.

Turning now to FIG. 2, a block diagram illustrating example responses to a read instruction 202 by one embodiment of initialization detection system 100 is shown. Accordingly, processing circuit 102, memory device 104, cache line 106, metadata 108, validity data 110, and storage location 112 are shown. Additionally, FIG. 2 illustrates a series of communications, which, in the illustrated embodiment, occur sequentially over time. These communications include read instruction 202, metadata request 206, metadata response 208, validity request 210, validity response 212, load request 214, load response 216, and read response 218. In other embodiments, the communications may be sent in other orders or in parallel. In some cases, some communications or portions of some communications may not be sent at all. For example, read response 218 may not be sent in response to processing circuit 102 determining that read instruction 202 is not authorized to proceed. As another example, validity request 210 may not be sent if metadata request 206 indicates that read instruction 202 is not authorized to proceed.

In the illustrated embodiment, processing circuit 102 receives read instruction 202 from a program and detects that read instruction 202 requests a read of a storage location corresponding to read address 204. Accordingly, in the illustrated embodiment, in response to read instruction 202, processing circuit 102 is configured to send metadata request 206 to memory device 104, requesting metadata corresponding to read address 204. In response to metadata request 206, memory device 104 is configured to identify metadata corresponding to read address 204 (in the illustrated example, metadata 108), and to send metadata 108 to processing circuit 102 as part of metadata response 208.

In the illustrated embodiment, in response to metadata response 208, processing circuit 102 is configured to analyze metadata 108. Specifically, processing circuit 102 is configured to determine whether metadata 108 indicates that read instruction 202 addresses valid data of the program. In response to metadata 108 indicating that read instruction 202 does not address valid data of the program, processing circuit 102 may be configured to send read response 218 to another portion of a processing pipeline, indicating that an error occurred regarding read instruction 202 (e.g., without sending validity request 210 or load request 214). In response to metadata 108 indicating that read instruction 202 addresses valid data of the program and indicating that all sections of cache line 106 store valid data of the program, processing circuit 102 is configured to determine that read instruction 202 is authorized to proceed (by sending load request 214 to memory device 104 and by including data stored at storage location 112 in read response 218). In response to metadata 108 indicating that read instruction 202 does address valid data of the program and indicating that one or more sections of cache line 106 do not store valid data of the program (and thus at least one section of cache line 106 stores validity data), processing circuit 102 is configured, via validity request 210, to request validity data corresponding to read address 204. In response to validity request 210, memory device 104 is configured to send validity data 110 to processing circuit 102 as part of validity response 212.

In the illustrated embodiment, in response to validity response 212, processing circuit is configured to analyze validity data 110. Specifically, processing circuit 102 is configured to determine whether validity data 110 indicates that read instruction 202 addresses valid data of the program. In response to validity data indicating that read instruction 202 does not address valid data of the program, processing circuit 102 may be configured to send read response 218 to another portion of a processing pipeline, indicating that an error occurred regarding read instruction 202 (e.g., without sending load request 214). On the other hand, if validity data 110 indicates that read instruction 202 accesses valid data of the program, processing circuit 102 is configured to determine that read instruction 202 is authorized to proceed by sending load request 214 to memory device 104, requesting data stored at storage location 112. In response to load request 214, memory device 104 is configured to send the data stored at storage location 112 to processing circuit 102 as part of load response 216. In response to load response 216, processing circuit 102 is configured to send the data stored at storage location 112 to another part of the processing pipeline as part of read response 218.

Accordingly, if metadata 108 indicates that read instruction 202 addresses a section of the cache line 106 that does not store valid data of the program, processing circuit 102 is typically configured to determine that read instruction 202 is not authorized to proceed. On the other hand, if metadata 108 indicates that all sections of cache line 106 addressed by read instruction 202 store valid data of the program, processing circuit 102 is typically configured to determine that read instruction 202 is authorized to proceed. However, if metadata 108 indicates that at least one section of cache line 106 does not store valid data of the program, such as in the example described below with reference to FIG. 5, then initialization detection system 100 may be able to more accurately determine whether read instruction 202 is improperly attempting to access data that has not been initialized, as compared to a system that only uses metadata 108.

In such an instance, validity data 110 may be used to determine whether read instruction 202 is authorized to proceed. In these embodiments, validity data 110 is stored in one or more sections of cache line 106 that do not store valid data of the program. As previously noted, validity data 110 has a finer level of granularity than metadata 108. Processing circuit 102 may detect validity data 110 using metadata 108 (by detecting one or more sections of cache line 106 that do not store valid data of the program). Processing circuit 102 may use validity data 110 to more accurately determine whether the particular storage location of cache line 106 addressed by read instruction 202 stores valid data of the program, and thus more accurately determine whether read instruction 202 is authorized to proceed.

In other embodiments, initialization detection system 100 performs the process described above differently. For example, in some embodiments, rather than separately requesting metadata 108, validity data 110, and the data of storage location 112, processing circuit 102 sends read address 204 (or a corresponding address) to memory device 104 and requests the contents of the cache line that contains the corresponding data (e.g., cache line 106). With the entire cache line 106 available, processing circuit 102 can then refer to metadata 108, validity data 110, and the data of storage location 112 without intervening requests. Additionally, in other embodiments, metadata request 206 is sent simultaneously with load request 214. Processing circuit 102 may perform processing (e.g., formatting, analysis, etc.) on the data stored at storage location 112 until processing circuit 102 determines whether read instruction 202 is authorized to proceed (e.g., based on metadata 108 or based on metadata 108 and validity data 110). In response to determining that read instruction 202 is not authorized to proceed, processing circuit 102 may prevent the data received in load response 216 (e.g., the data stored at storage location 112) from being sent to another part of the processing pipeline as part of read response 218.

Figure 3:
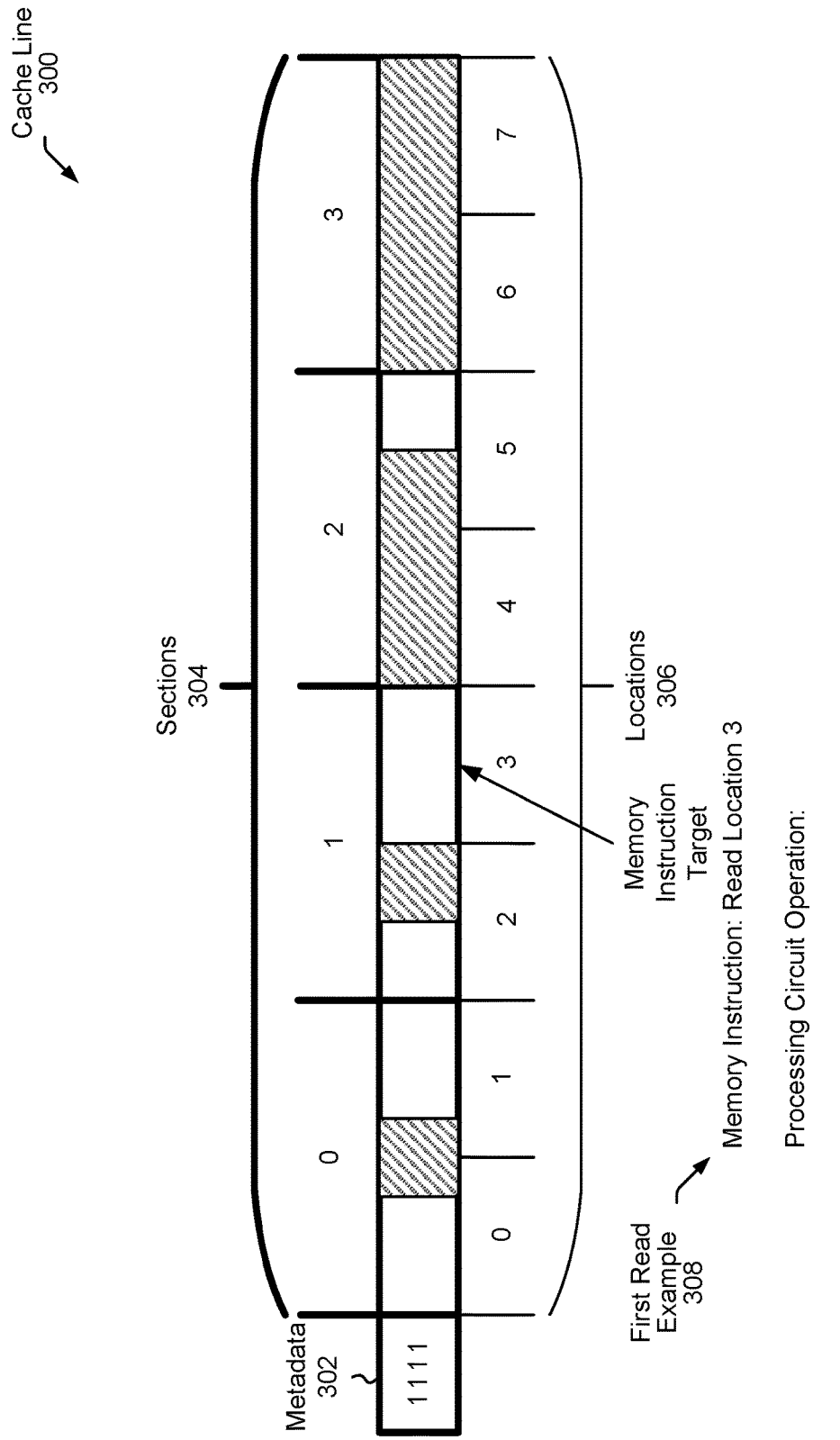
FIG. 3 is a block diagram illustrating an example cache line and an example response to an example read instruction by one embodiment of an exemplary initialization detection system.
Figure 4:
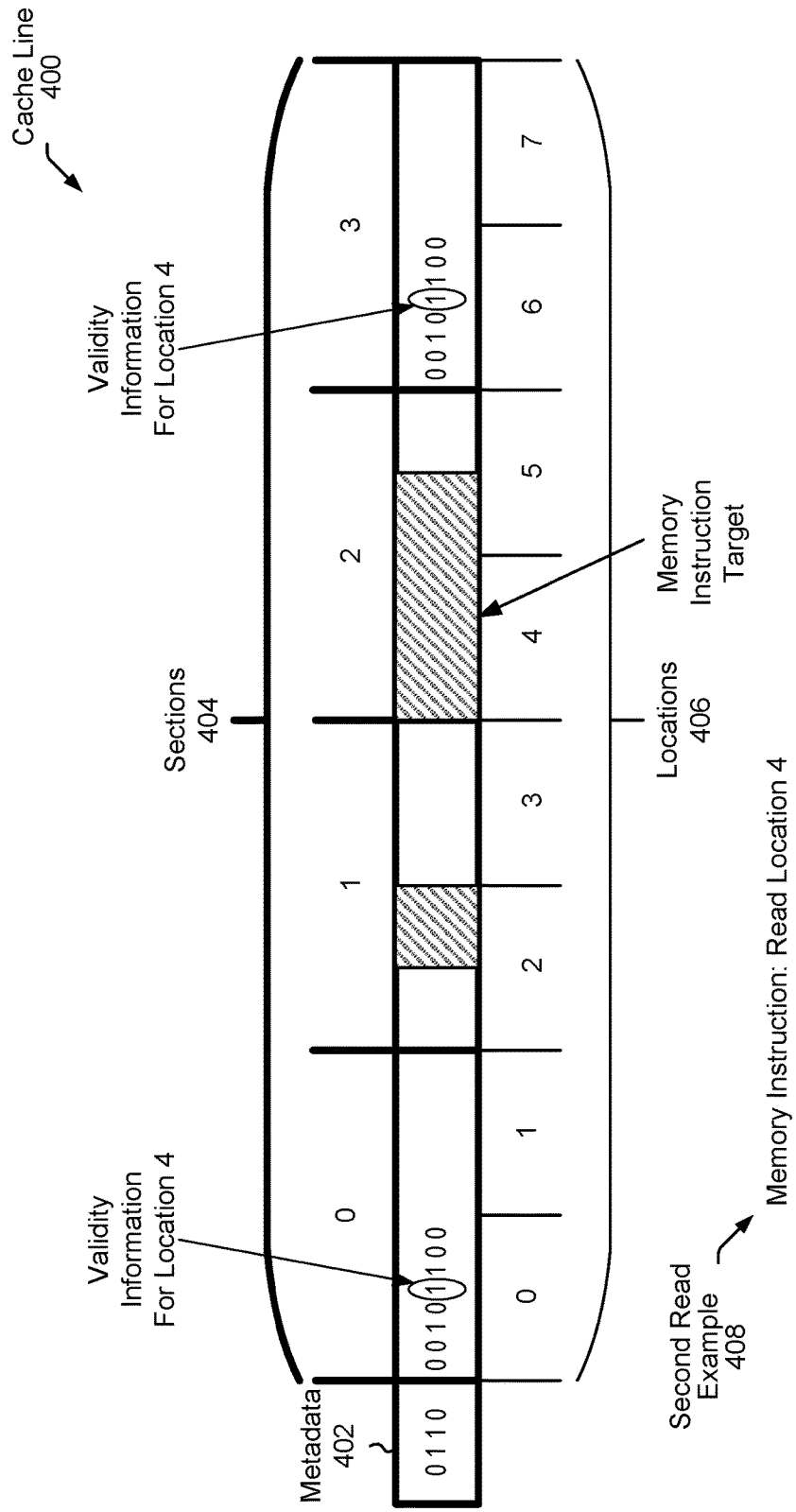
FIG. 4 is a block diagram illustrating an example cache line and an example response to an example read instruction by one embodiment of an exemplary initialization detection system.
Figure 5:
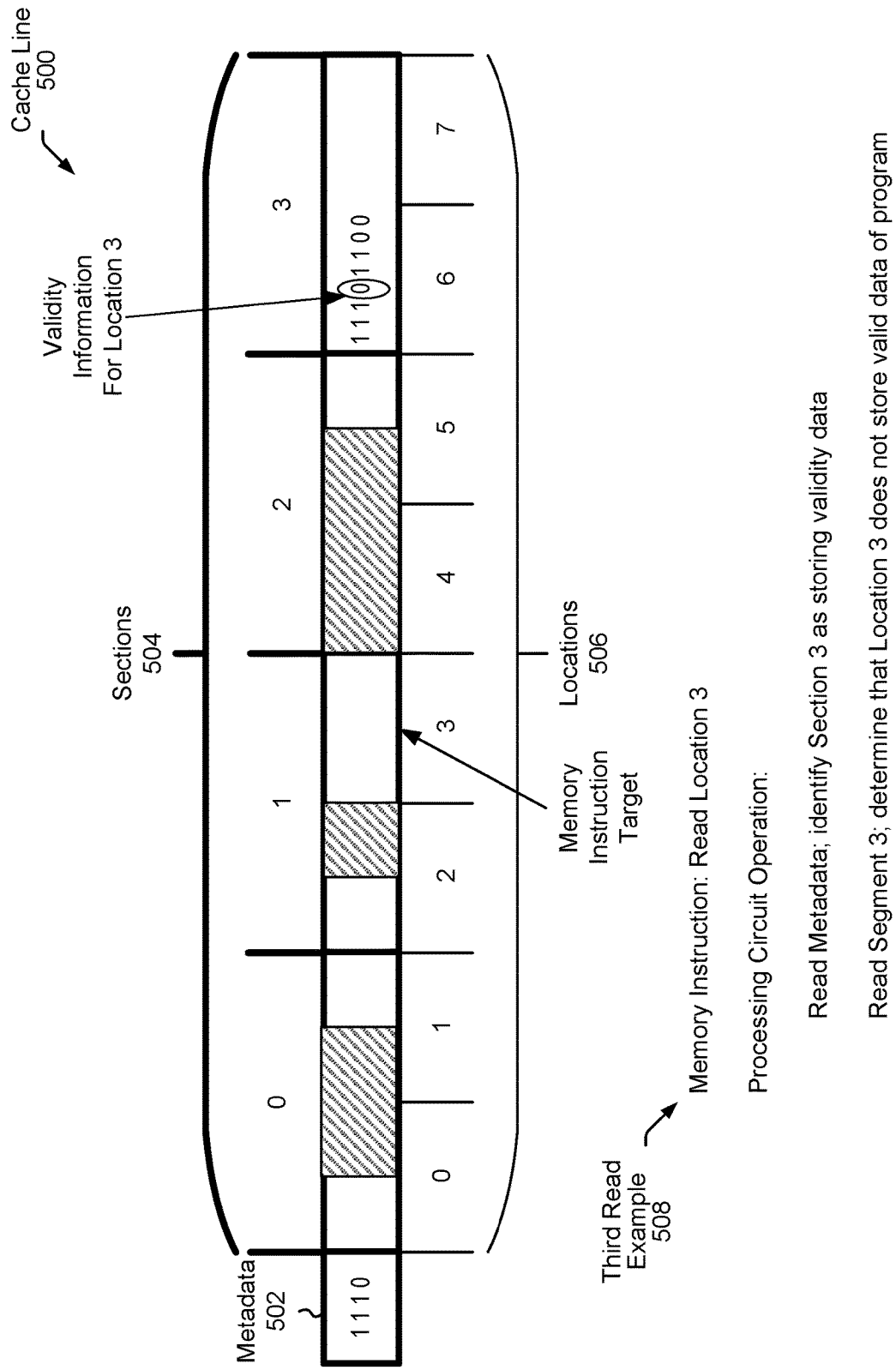
FIG. 5 is a block diagram illustrating an example cache line and an example response to an example read instruction by one embodiment of an exemplary initialization detection system.

FIGS. 3-5 illustrate various example responses by an initialization detection system to read instructions by a program, depending on where valid data of the program is stored in corresponding cache lines. These examples are also applicable to non-cache memory devices. Cache lines depicted in FIGS. 3-5 are described as having "sections" and "locations." Within the context of this disclosure, "sections" are referred to by metadata and "locations" are referred to by validity data. As noted above, validity data is more granular than corresponding metadata and thus points to more, smaller portions of a memory device. Although locations (are illustrated in these figures as having a number of bits equal to half of a number of bits in sections, in other embodiments, locations can include different numbers of bits, and may not evenly divide into sections. For example, locations may have ⅔ of the number of bits of a section or ¹⁄₁₆ of the number of bits of a section.

Turning now to FIG. 3, a block diagram is shown that illustrates an example cache line 300 and an example response to a first read instruction by one embodiment of an initialization detection system. In the illustrated embodiment, cache line 300 includes metadata 302. Cache line 300 is divided into four sections 304 and into eight locations 306 (e.g., storage locations such as storage location 112). Portions of cache line 300 are patterned (hatched). These patterned portions denote portions of cache line 300 that have been allocated to a program that includes the read instruction indicated in first read example 308. These patterned portions include valid data of that program. that store valid data of a program to which memory locations cached by cache line 300 are allocated in first read example 308. Unpatterned (non-hatched) portions of cache line 300 illustrate portions of cache line 300 that do not store valid data of the program. In the illustrated embodiment, each bit in metadata 302 corresponds to one of the sections 304 in cache line 300. In this example, a bit set to "1" in metadata 302 indicates a section storing at least some valid data of the program and a "0" indicates a section storing no valid data of the program. In some embodiments, cache line 300 corresponds to cache line 106 and metadata 302 corresponds to metadata 108.

In the illustrated embodiment, first read example 308 describes an example operation performed by a processing circuit (e.g., processing circuit 102) in response to a memory instruction (e.g., read instruction 202) from a program. In the example, the memory instruction requests a read of location 3 within locations 306, which is illustrated as "memory instruction target" in FIG. 3. In the illustrated example, location 3 does not store valid data of the program. In response to the memory instruction, metadata 302 is read. Metadata 302 indicates that all sections 304 of cache line 300 store valid data of the program. In the example, because metadata 302 indicates that section 1 within sections 304 includes at least some valid data of the program, and because metadata 302 does not identify any validity data, the memory instruction is authorized (even though location 3 does not store valid data of the program). Thus, in this example, because the system is unable to utilize validity data, the system may erroneously indicate that the memory instruction is authorized.

Turning now to FIG. 4, a block diagram illustrating cache line 400 and an example response to an example second read instruction by one embodiment of an initialization detection system is shown. In the illustrated embodiment, cache line 400 includes metadata 402. Cache line 400 is divided into four sections 404 and into eight locations 406 (e.g., storage locations such as storage location 112). Portions of cache line 400 are patterned (hatched). As in FIG. 3, these patterned portions denote portions of cache line 400 that have been allocated to a program that includes the read instruction indicated in second read example 408. These patterned portions store valid data of that program. Unpatterned (non-hatched) portions of cache line 400 denote portions of cache line 400 that do not store valid data of the program. Metadata 402, as in FIG. 3, includes a bit corresponding to each of sections 404. In the illustrated embodiment, a "1" in metadata 402 indicates a section that stores at least some valid data of the program, and a "0" indicates a section that does not store any valid data of the program. In this example, the sections of cache line 400 that do not include any valid data of the program store validity data. This validity data indicates locations of cache line 400 that store valid data of the program, and may do so using a format similar to that of metadata 402. In this example, the validity data is identical in both sections 0 and 3, and denotes that locations 2, 4, and 5 include at least some valid data of the program. In some embodiments, cache line 400 corresponds to cache line 106, metadata 402 corresponds to metadata 108, and the validity data corresponds to validity data 110.

In the illustrated embodiment, second read example 408 includes an example operation performed by a processing circuit (e.g., processing circuit 102) in response to a memory instruction (e.g., read instruction 202) from a program. In the example, the memory instruction requests a read of location 4 of locations 406. This location is illustrated as "memory instruction target" in FIG. 4. In the example, location 4 stores valid data of the program. In response to the memory instruction, metadata 402 is read. Metadata 402 indicates that sections 0 and 3 of sections 404 do not store valid data of the program, which indicates that these sections may store the more granular validity data. In the illustrated embodiment, the validity data in these sections indicates that location 4 stores valid data of the program. Accordingly, the memory instruction is authorized.

As illustrated in FIG. 4, in some embodiments, when multiple sections of cache line 400 do not store valid data of the program, the multiple sections may be used to store the validity data. As further discussed with reference to FIG. 11, in other embodiments, only a single section (e.g., a section corresponding to a most significant bit of metadata 402) may be used to store the validity data.

Turning now to FIG. 5, a block diagram illustrating cache line 500 and an example response to a read instruction by one embodiment of an initialization detection system is shown. In the illustrated embodiment, cache line 500 includes metadata 502. Cache line 500 is divided into four sections 504 and into eight locations 506 (e.g., storage locations such as storage location 112). Portions of cache line 500 are patterned (hatched). These patterned portions denote portions of cache line 500 that have been allocated to a program that includes third read example 508. These portions include valid data of that program. Unpatterned (non-hatched) portions of cache line 500 illustrate portions of cache line 500 that do not store valid data of the program. The format of metadata 502 and the validity data stored in section 3 is similar to that described in FIGS. 3 and 4. Specifically, validity data stored in section 3 indicates which locations of cache line 500 store valid data of the program. In some embodiments, cache line 500 corresponds to cache line 106, metadata 502 corresponds to metadata 108, and the validity data corresponds to validity data 110.

In the illustrated embodiment, third read example 508 includes an example operation performed by a processing circuit (e.g., processing circuit 102) in response to a memory instruction (e.g., read instruction 202) from a program. In the example, the memory instruction requests a read of location 3 of locations 506, which is illustrated as "memory instruction target" in FIG. 5. In the illustrated example, location 3 stores valid data of the program. In response to the memory instruction, metadata 502 is read. Metadata 502 indicates that section 3 of sections 404 does not store valid data of the program. In the illustrated embodiment, section 3 of sections 504 stores validity data, which indicates that location 3 does not store valid data of the program. Accordingly, the memory instruction is not authorized.

Figure 6:
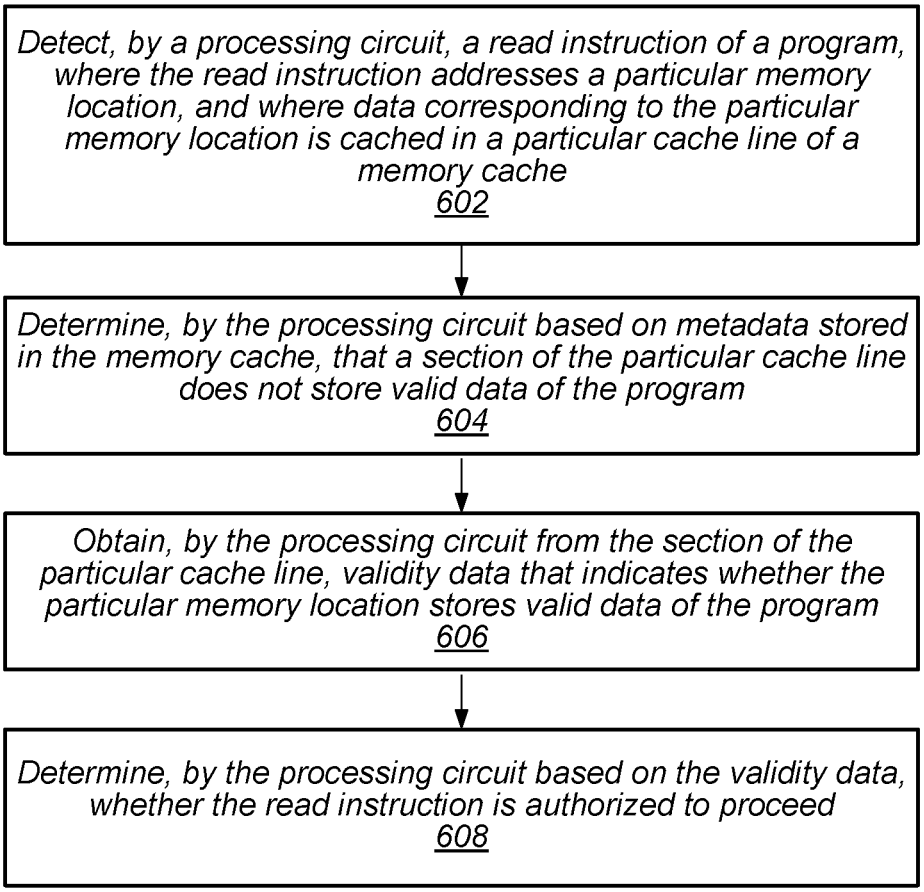
FIG. 6 is a flow diagram illustrating one embodiment of a method of reading from a memory device using an initialization detection system.

Turning now to FIG. 6, a flow diagram of a method 600 of one embodiment of a method of performing a read operation for a program using an initialization detection system, such as initialization detection system 100 of FIG. 2. Some portions of method 600 may be performed in other orders or simultaneously.

At 602, method 600 includes detecting, by a processing circuit, a read instruction of a program, where the read instruction addresses a particular memory location, and where data corresponding to the particular memory location is cached in a particular cache line of a memory cache. For example, method 600 may include processing circuit 102 detecting read instruction 202, where read instruction 202 specifies read address 204, and where data corresponding to read address 204 is cached at storage location 112 in cache line 106 of memory device 104.

At 604, method 600 includes determining, by the processing circuit based on metadata stored in the memory cache, that a section of the particular cache line does not store valid data of the program. For example, method 600 may include processing circuit 102 determining, based on metadata (e.g., metadata 402 or metadata 502) that one or more sections (e.g., sections 0 and 3 of sections 404 or section 3 of sections 504) of the cache line 106 does not store valid data of the program.

At 606, method 600 includes obtaining, by the processing circuit from the section of the particular cache line, validity data that indicates whether the particular memory location stores valid data of the program. For example, method 600 may include processing circuit 102 obtaining, from one of the one or more sections (e.g., sections 0 and 3 of sections 404 or section 3 of sections 504) validity data (e.g., validity data 110) that indicates whether storage location 112 stores valid data of the program.

At 608, method 600 includes determining, by the processing circuit based on the validity data, whether the read instruction is authorized to proceed. For example, method 600 may include processing circuit 102 determining, based on validity data 110 whether read instruction 202 is authorized to proceed.

Figure 7:
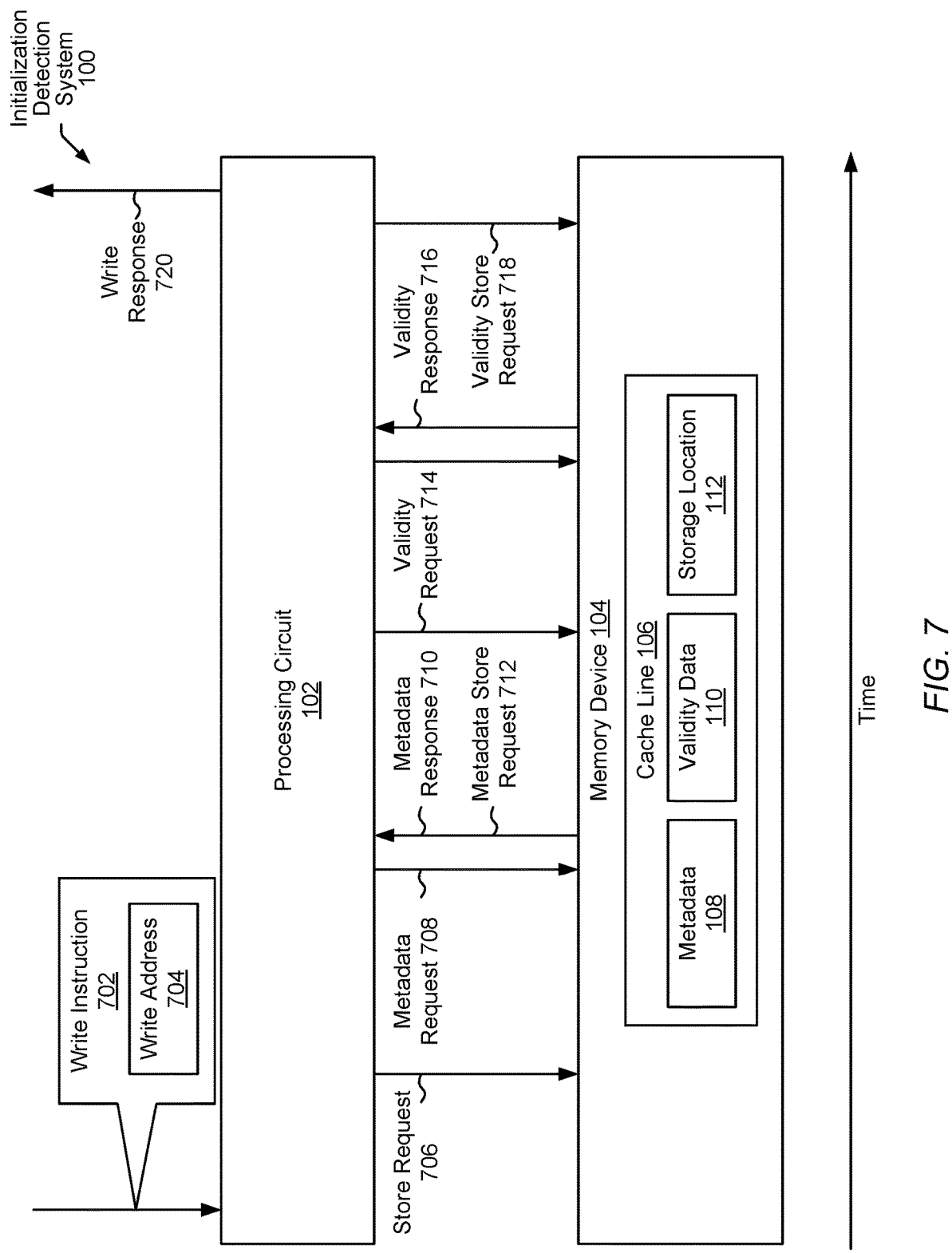
FIG. 7 is a block diagram illustrating example responses to a write instruction by one embodiment of an exemplary initialization detection system.

Turning now to FIG. 7, a block diagram illustrating example responses to a write instruction 702 by one embodiment of initialization detection system 100 is shown. Accordingly, processing circuit 102, memory device 104, cache line 106, metadata 108, validity data 110, and storage location 112 are shown. Additionally, FIG. 7 illustrates a series of communications, write instruction 702, store request 706, metadata request 708, metadata response 710, metadata store request 712, validity request 714, validity response 716, validity store request 718, and write response 720, which, in the illustrated embodiment, occur over time. However, in other embodiments, the communications may be sent in other orders, in parallel, or, in some cases, some communications or portions of some communications may not be sent at all.

In the illustrated embodiment, processing circuit 102 receives write instruction 702 from a program and generates store request 706 for memory device 104. Store request 706 requests storage of data from write instruction 702 in storage location 112. Storage location 112 may cache data for a memory location corresponding to write address 704.

In response to write instruction 702, processing circuit 102 is configured to send metadata request 708 to memory device 104. In response to metadata request 708, memory device 104 is configured to identify metadata corresponding to write address 704 (in the illustrated example, metadata 108), and to send metadata 108 to processing circuit 102 as part of metadata response 710. In the illustrated embodiment, metadata 108, as received in metadata response 710, represents a state of cache line 106 prior to cache line 106 being updated by write instruction 702.

In the illustrated embodiment, in response to metadata response 710, processing circuit 102 is configured to determine whether metadata 108 should be updated, based on write instruction 702, using metadata store request 712. Specifically, processing circuit 102 is configured to treat storage location 112 as storing valid data of the program. Based on storage location 112 storing valid data of the program, processing circuit 102 is configured to determine whether metadata 108 is now incorrect (and should be updated). For example, if metadata 108 indicates that a section including storage location 112 stores valid data of the program, then processing circuit 102 may determine that metadata 108 is up to date (and should not be modified). As another example, if metadata 108 indicates that a section including storage location 112 does not store valid data of the program, then processing circuit 102 may determine that metadata 108 should be updated using metadata store request 712.

In response to metadata 108 indicating the existence of validity data 110, processing circuit 102 is configured to, in some cases, obtain validity data 110 using validity request 714. In response to validity request 714, memory device is configured to send corresponding validity data 110 as part of validity response 716. In the illustrated embodiment, validity data 110, as received in validity response 716, represents a state of cache line 106 prior to cache line 106 being updated by write instruction 702.

In the illustrated embodiment, in response to validity response 716, processing circuit 102 is configured to determine whether validity data 110 should be updated, based on write instruction 702, using validity store request 718. Specifically, processing circuit 102 is configured to treat storage location 112 as storing valid data of the program. Based on storage location 112 storing valid data of the program, processing circuit 102 is configured to determine whether validity data 110 is now incorrect (and should be updated) in a manner similar to metadata 108.

In some embodiments, prior to requesting validity data 110, processing circuit 102 is configured to further determine whether, prior to the write instruction 702 updating storage location 112, validity data 110 was stored only at a section of cache line 106 that includes storage location 112. In other words, processing circuit 102 may be configured to determine whether write instruction 702 causes metadata 108 to indicate that all sections of cache line 106 store valid data of the program. If processing circuit 102 determines that, after metadata 108 is updated, metadata 108 will indicate that all sections of cache line 106 store valid data of the program, processing circuit 102 may determine that validity data 110 should not be updated because processing circuit 102 may no longer be able to identify whether validity data 110 is stored at cache line 106. Accordingly, the effects of the write operation on the existing validity data may be ignored (even if the validity data is not overwritten by the write operation). (because metadata 108 will no longer refer to validity data 110). Thus, in some embodiments, validity data 110 may not be modified even if validity data 110 is now incorrect.

In some embodiments, validity data 110 is only stored at a first section of cache line 106 that does not store valid data of the program, even if several sections of cache line 106 do not store valid data of the program. Processing circuit 102 may be configured to detect, based on metadata 108, that write instruction 702 addresses the first section of cache line 106. In response to detecting that write instruction 702 addresses the first section of cache line 106 and further detecting that a second section of cache line 106 does not store valid data of the program, processing circuit 102 may be configured to copy validity data 110 to the second section of cache line 106 and to update validity data 110. Alternatively, processing circuit 102 may request, via validity store request 718, that an updated version of validity data 110 be stored at the section of cache line 106.

In some embodiments, validity data 110 is stored at several sections of cache line 106. Accordingly, in response to determining that validity data 110 should be updated at the several sections in response to write instruction 702, processing circuit 102 may request, in validity store request 718, that validity data 110 be updated at all of the several sections. If processing circuit 102 determines that write instruction 702 addresses a particular section that includes an instance of validity data 110, processing circuit 102 may not request that validity data 110 be updated at the particular section.

In other embodiments, initialization detection system 100 performs the process described above differently. For example, in some embodiments, rather than separately requesting metadata 108, validity data 110, and the data of storage location 112, processing circuit 102 sends write address 704 (or a corresponding address) to memory device 104 and requests the contents of the cache line that contains the corresponding data (e.g., cache line 106). Accordingly, processing circuit 102 can refer to metadata 108, validity data 110, and the data of storage location 112 without intervening requests. Additionally in some embodiments, write response 720 is sent after store request 706 and prior to metadata request 708. As another example, store request 706 may be sent after validity store request 718.

FIGS. 8-11 illustrate various example responses by an initialization detection system to write instructions by a program, depending on where valid data of the program is stored in corresponding cache lines. However, these examples may be similarly applicable to non-cache memory devices. As with FIGS. 3-5, FIGS. 8-11 refer to "sections" and "locations" of a cache line. In the embodiment shown in FIG. 8, each section of cache line 800 includes two of locations 806. However, in other embodiments, locations can include different numbers of bits and may not evenly divide into sections. For example, locations may have ⅔ of the number of bits of a section or 1/16 of the number of bits of a section in various embodiments.

Figure 8:
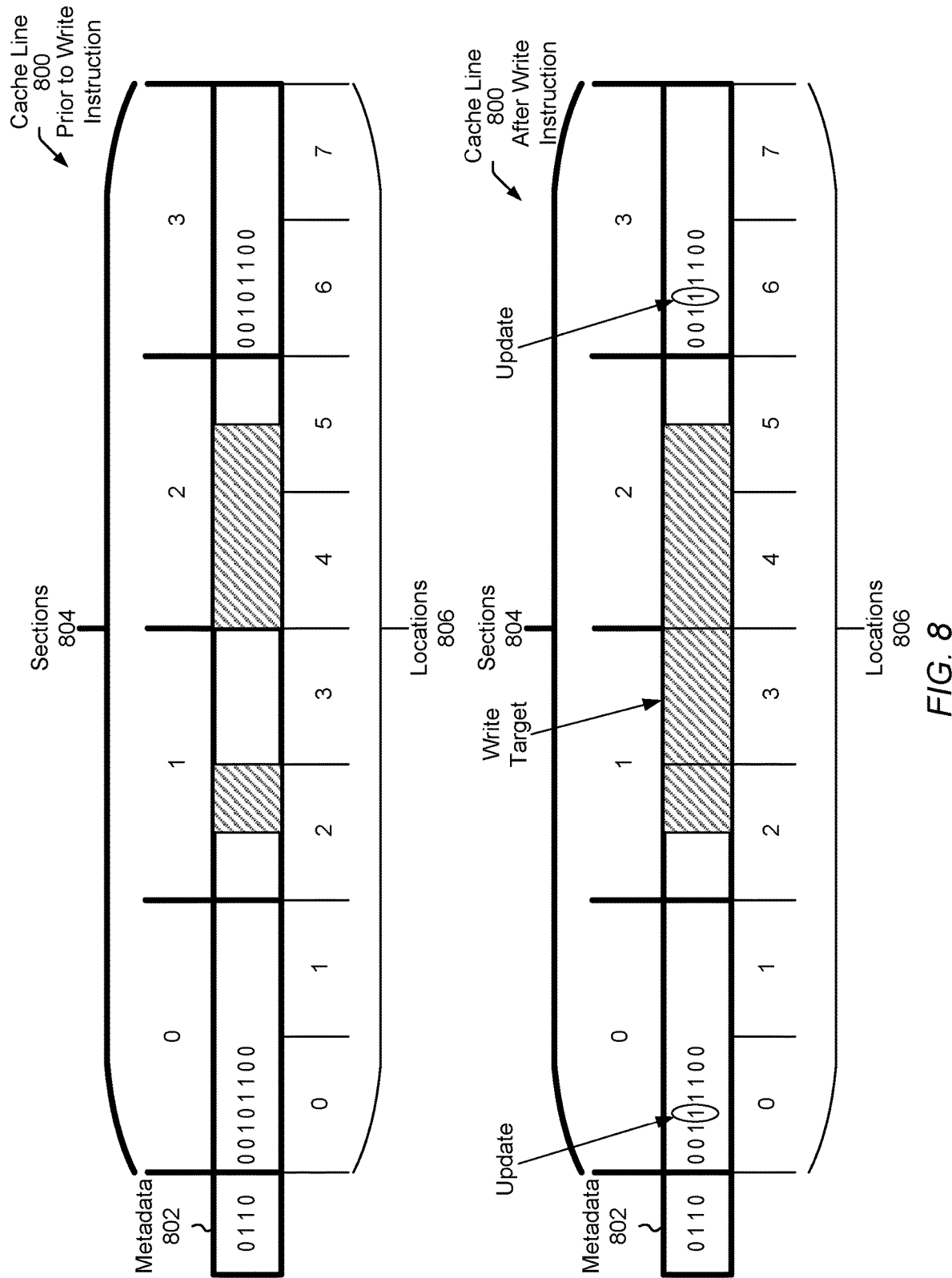
FIG. 8 is a block diagram illustrating an example write instruction applied to an example cache line by one embodiment of an exemplary initialization detection system.

Turning now to FIG. 8, block diagrams illustrating cache line 800 prior to a write instruction and cache line 800 after a write instruction are shown. In the illustrated embodiment, cache line 800 includes metadata 802. Cache line 800 is divided into four sections 804 and into eight locations 806 (e.g., storage locations such as storage location 112). Portions of cache line 800 are patterned (hatched). These patterned portions denote portions of cache line 800 that have been allocated to a program that issues the write instruction to cache line 800. These patterned portions store valid data of that program. Unpatterned (non-hatched) portions of cache line 800 denote portions of cache line 800 that do not store valid data of the program. Metadata 802 includes a bit corresponding to each of sections 804. In the illustrated embodiment, a "1" in metadata 802 indicates a section that stores at least some valid data of the program, and a "0" indicates a section that does not store any valid data of the program. In this example, the sections of cache line 800 that do not include any valid data of the program store validity data. This validity data indicates locations of cache line 800 that store valid data of the program, and may do so using a format similar to that of metadata 802. In this example, the validity data is identical in both sections 0 and 3, and, prior to the write instruction, denotes that locations 2, 4, and 5 include at least some valid data of the program. In some embodiments, cache line 800 corresponds to cache line 106, metadata 802 corresponds to metadata 108, and the validity data corresponds to validity data 110.

In the illustrated example, a write instruction targets location 3 within locations 806. Prior to the write instruction, section 1, which includes location 3, already includes valid data of the program. Accordingly, metadata 802 is not updated as a result of the write instruction. However, prior to the write instruction, location 3 did not include valid data of the program. Accordingly, the validity data is updated in response to the write instruction. In the illustrated example, the validity data is stored at multiple sections (sections 0 and 3), so the validity data at both sections is updated in response to the write instruction.

Figure 9:
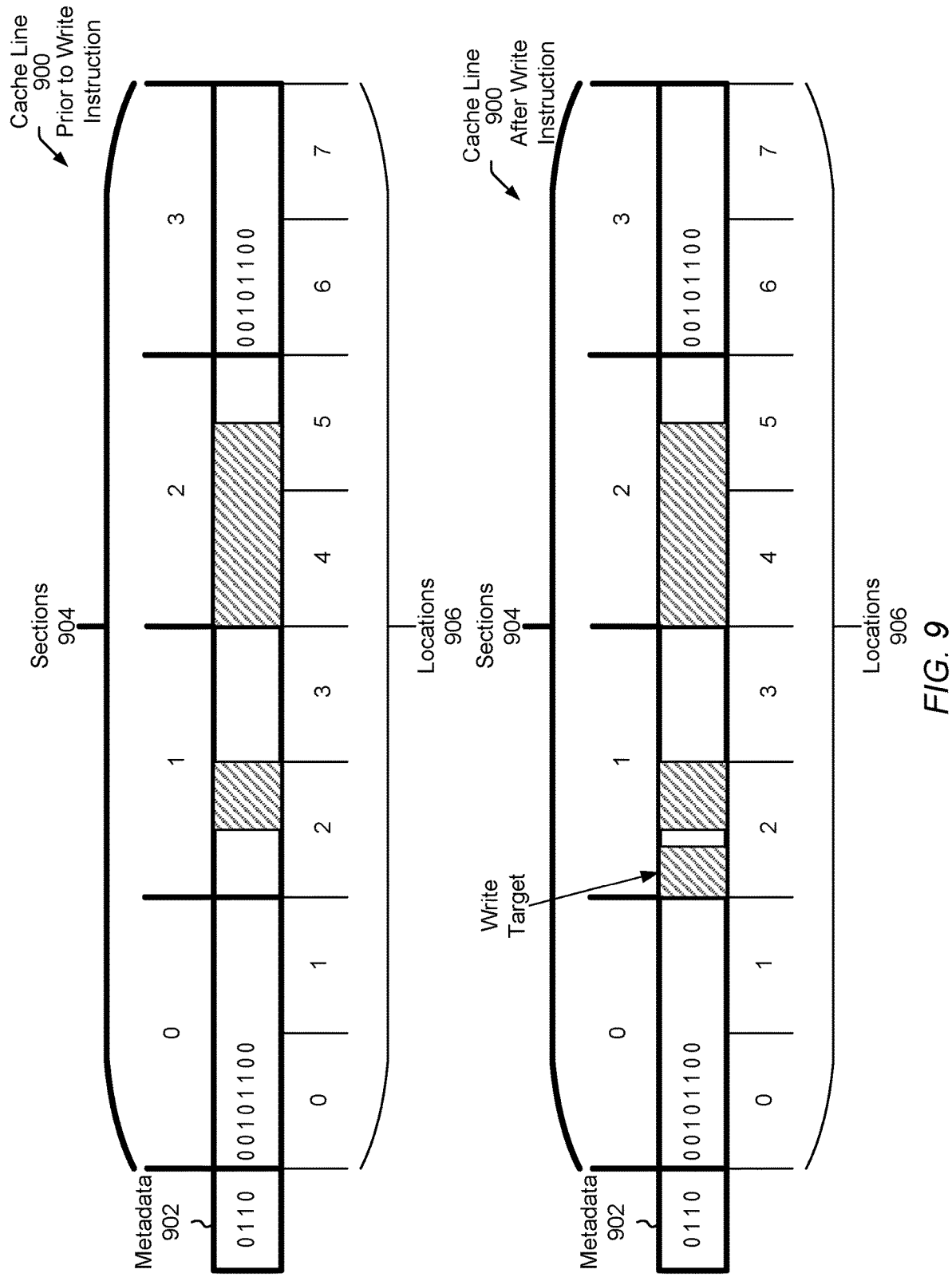
FIG. 9 is a block diagram illustrating an example write instruction applied to an example cache line by one embodiment of an exemplary initialization detection system.

Turning now to FIG. 9, block diagrams illustrating cache line 900 prior to a write instruction and cache line 900 after a write instruction are shown. In the illustrated embodiment, cache line 900 includes metadata 902. Cache line 900 is divided into four sections 904 and into eight locations 906

(e.g., storage locations such as storage location 112). Portions of cache line 900 are patterned (hatched). As in FIG. 8, these patterned portions denote portions of cache line 900 that have been allocated to a program that issues the write instruction to cache line 900. These patterned portions store valid data of that program. Unpatterned (non-hatched) portions of cache line 900 denote portions of cache line 900 that do not store valid data of the program. Metadata 902, as in FIG. 8, includes a bit corresponding to each of sections 904. In the illustrated embodiment, a "1" in metadata 902 indicates a section that stores at least some valid data of the program and a "0" indicates a section storing no valid data of the program. In this example, the sections of cache line 900 that do not include any valid data of the program store validity data. This validity data indicates locations of cache line 900 that store valid data of the program, and may do so using a format similar to that of metadata 902. In this example, the validity data is identical in both sections 0 and 3, and, prior to the write instruction, denotes that locations 2, 4, and 5 include at least some valid data of the program. In some embodiments, cache line 900 corresponds to cache line 106, metadata 902 corresponds to metadata 108, and the validity data corresponds to validity data 110.

In the illustrated example, a write instruction targets location 2 within locations 906. Prior to the write instruction, section 1, which includes location 2, includes valid data of the program. Accordingly, metadata 902 is not updated as a result of the write instruction. Similarly, prior to the write instruction, location 2 includes valid data of the program. Accordingly, the validity data is not updated in response to the write instruction.

Figure 10:
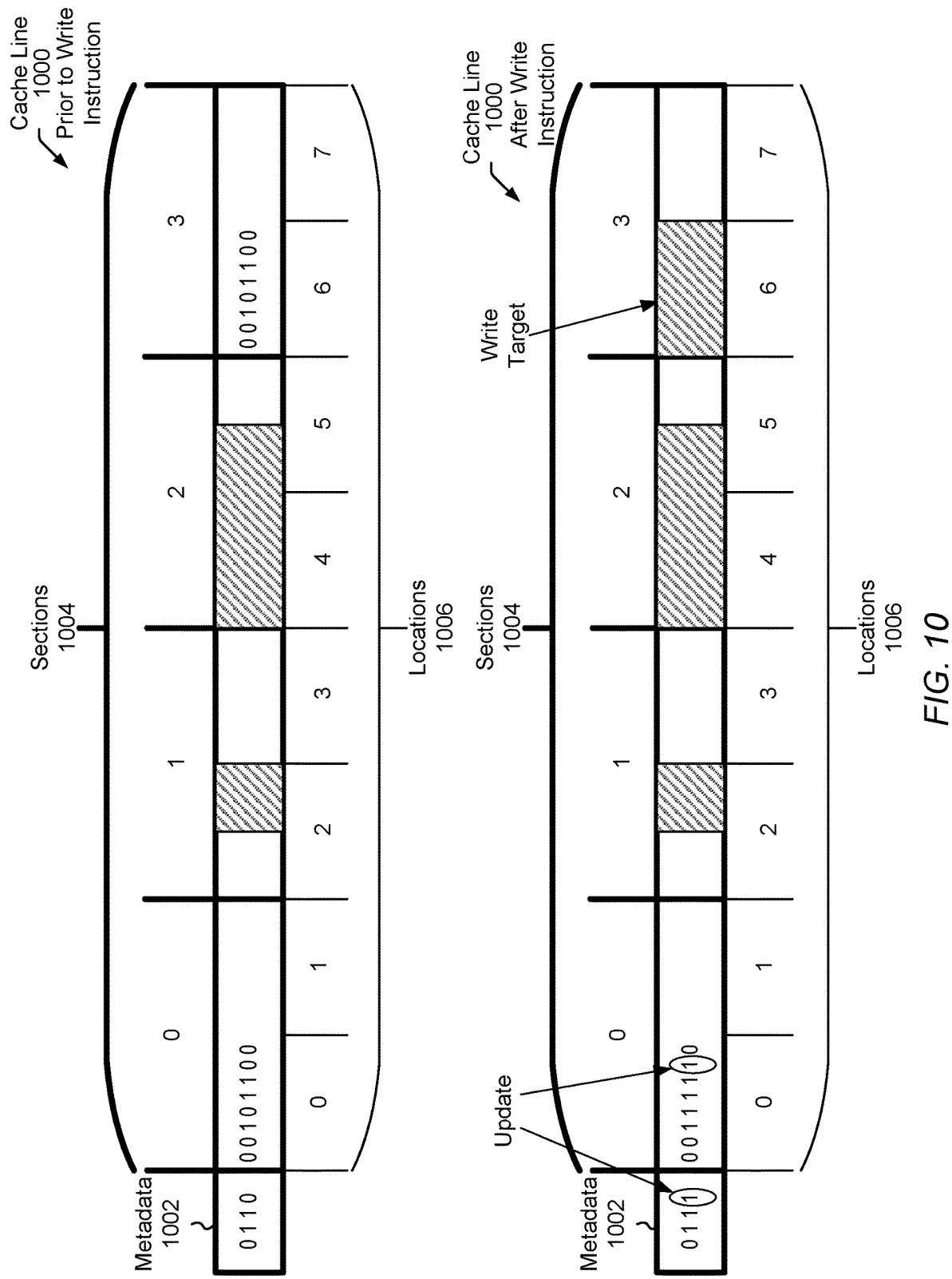
FIG. 10 is a block diagram illustrating an example write instruction applied to an example cache line by one embodiment of an exemplary initialization detection system.

Turning now to FIG. 10, block diagrams illustrating cache line 1000 prior to a write instruction and cache line 1000 after a write instruction are shown. In the illustrated embodiment, cache line 1000 includes metadata 1002. Cache line 1000 is divided into four sections 1004 and into eight locations 1006 (e.g., storage locations such as storage location 112). Portions of cache line 1000 are patterned (hatched). As in FIG. 8, these patterned portions denote portions of cache line 1000 that have been allocated to a program that issues the write instruction to cache line 1000. These patterned portions store valid data of that program. Unpatterned (non-hatched) portions of cache line 1000 denote portions of cache line 1000 that do not store valid data of the program. Metadata 1002, as in FIG. 8, includes a bit corresponding to each of sections 1004. In the illustrated embodiment, a "1" in metadata 1002 indicates a section that stores at least some valid data of the program and a "0" indicates a section that does not store any valid data of the program. In this example, the sections of the cache line that do not include any valid data of the program store validity data. This validity data indicates locations of cache line 1000 that store valid data of the program, and may do so using a format similar to that of metadata 1002. In this example, prior to the write instruction, the validity data is identical in both sections 0 and 3, and denotes that locations 2, 4, and 5 include at least some valid data of the program. In some embodiments, cache line 1000 corresponds to cache line 106, metadata 1002 corresponds to metadata 108, and the validity data corresponds to validity data 110.

In the illustrated example, a write instruction targets location 6 within locations 1006. Prior to the write instruction, section 3, which includes location 6, does not include valid data of the program. Accordingly, metadata 1002 is updated as a result of the write instruction. Similarly, prior to the write instruction, location 6 did not include valid data of the program. Accordingly, the validity data of section 0 is updated in response to the write instruction. Additionally, the validity data stored at section 3 is not updated because the write instruction addressed a location in section 3.

Figure 11:
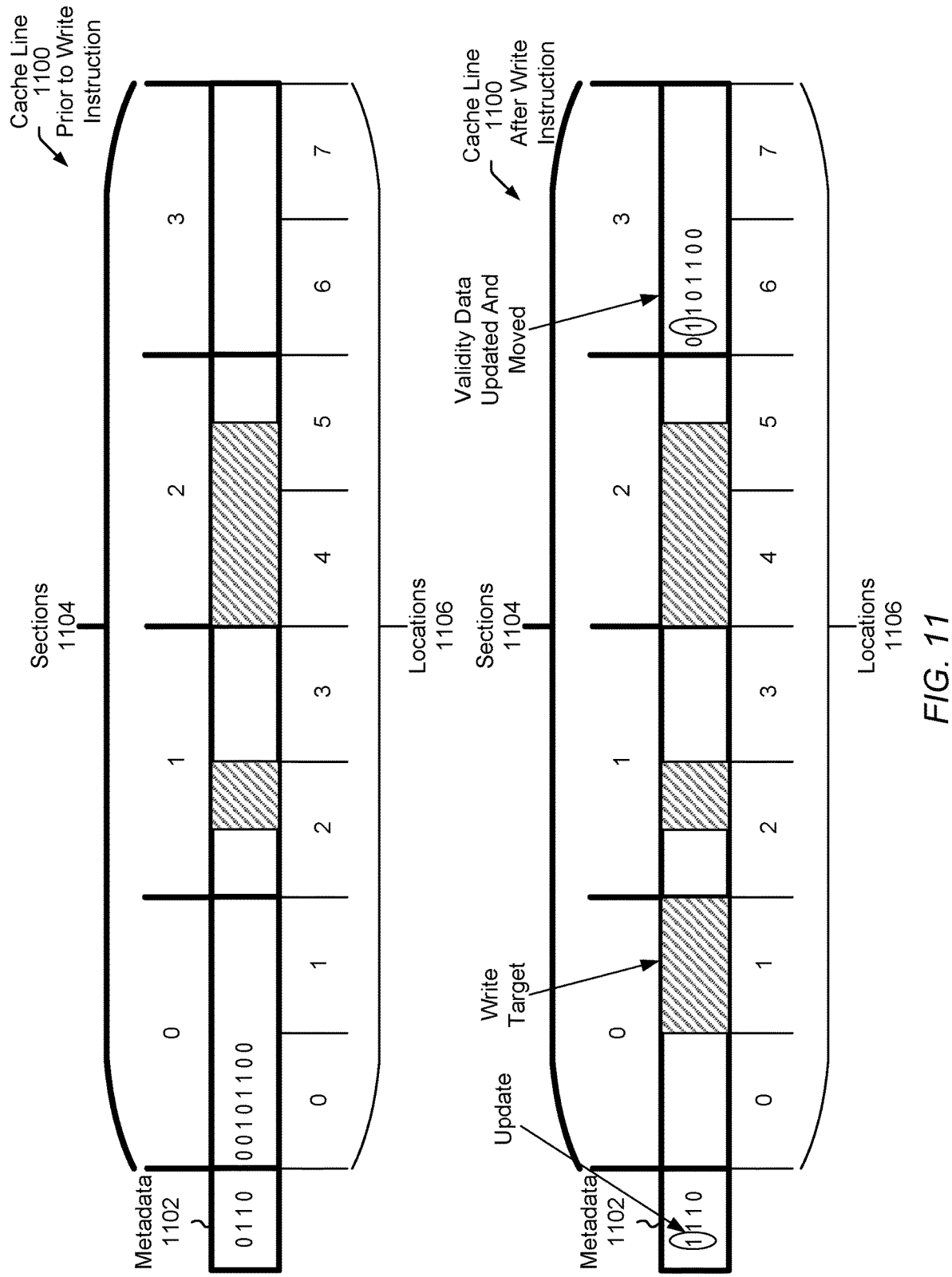
FIG. 11 is a block diagram illustrating an example write instruction applied to an example cache line by one embodiment of an exemplary initialization detection system.

Turning now to FIG. 11, block diagrams illustrating cache line 1100 prior to a write instruction and cache line 1100 after a write instruction are shown. In the illustrated embodiment, cache line 1100 includes metadata 1102. Cache line 1000 is divided into four sections 1104 and into eight locations 1106 (e.g., storage locations such as storage location 112). Portions of cache line 1100 are patterned (hatched). As in FIG. 8, these patterned portions denote portions of cache line 1100 that have been allocated to a program that issues the write instruction to cache line 1100. Unpatterned (non-hatched) portions of cache line 1100 denote portions of cache line 1100 that do not store valid data of the program. Metadata 1102, as in FIG. 8, includes a bit corresponding to each of sections 1104. In the illustrated embodiment, a "1" in metadata 1102 indicates a section that stores at least some valid data of the program and a "0" indicates a section that does not store any valid data of the program. This validity data indicates locations of cache line 1100 that store valid data of the program, and may do so using a format similar to that of metadata 1102. In this example, prior to the write instruction, the validity data is only stored in section 0, even though section 3 does not store valid data of the program. Prior to the write instruction, the validity data denotes that locations 2, 4, and 5 include at least some valid data of the program. In some embodiments, cache line 1100 corresponds to cache line 106, metadata 1102 corresponds to metadata 108, and the validity data corresponds to validity data 110.

In the illustrated example, a write instruction targets location 1 within locations 1106. Prior to the write instruction, section 0, which includes location 1, does not include valid data of the program. Accordingly, metadata 1102 is updated as a result of the write instruction. Similarly, prior to the write instruction, location 1 did not include valid data of the program. Accordingly, the validity data of section 1 is updated in response to the write instruction. In this case, the write instruction addressed the section (section 0) that stored the validity data. However, another section (section 3) similarly did not store valid data of the program. Accordingly, in the illustrated example, the validity data is updated and moved from section 0 to section 3.

Figure 12:
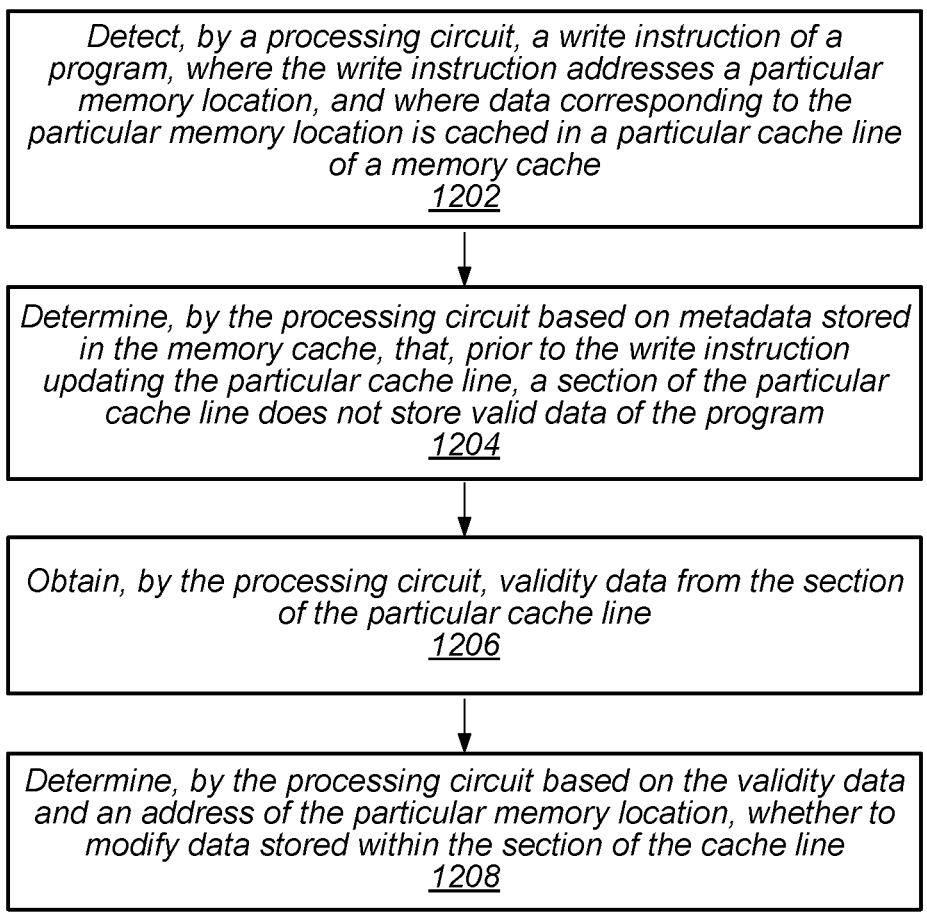
FIG. 12 is a flow diagram illustrating one embodiment of a method of writing to a memory device using an initialization detection system.

Turning now to FIG. 12, a flow diagram of a method 1200 of one embodiment of a method of performing a write operation for a program using an initialization detection system, such as initialization detection system 100 of FIG. 7. Some portions of method 1200 may be performed in other orders or simultaneously.

At 1202, method 1200 includes detecting, by a processing circuit, a write instruction of a program, where the write instruction addresses a particular memory location, and where data corresponding to the particular memory location is cached in a particular cache line of a memory cache. For example, method 1200 may include processing circuit 102 detecting write instruction 702, where write instruction 702 specifies write address 704, and where data corresponding to write address 704 is cached at storage location 112 in cache line 106 of memory device 104.

At 1204, method 1200 includes determining, by the processing circuit based on metadata stored in the memory cache, that, prior to the write instruction updating the particular cache line, a section of the particular cache line does not store valid data of the program. For example, method 1200 may include processing circuit 102 determining, based on metadata (e.g., metadata 1002, or metadata 1102) that one or more sections (e.g., sections 0 and 3 of sections 1004 or sections 0 and 3 of sections 1104) of the cache line 106 does not store valid data of the program.

At 1206, method 1200 includes obtaining, by the processing circuit, validity data from the section of the particular cache line. For example, method 1200 may include processing circuit 102 obtaining, from one of the one or more sections (e.g., sections 0 and 3 of sections 1004 or section 0 of sections 1104) validity data (e.g., validity data 110) that indicates whether storage location 112 stores valid data of the program.

At 1208, method 1200 includes determining, by the processing circuit based on the validity data and an address of the particular memory location, whether to modify data stored within the section of the cache line. For example, method 1200 may include processing circuit 102 determining, based on validity data 110 and the address of storage location 112 whether to modify data stored within the one or more sections (e.g., sections 0 and 3 of sections 1004 or section 0 of sections 1104).

Figure 13:
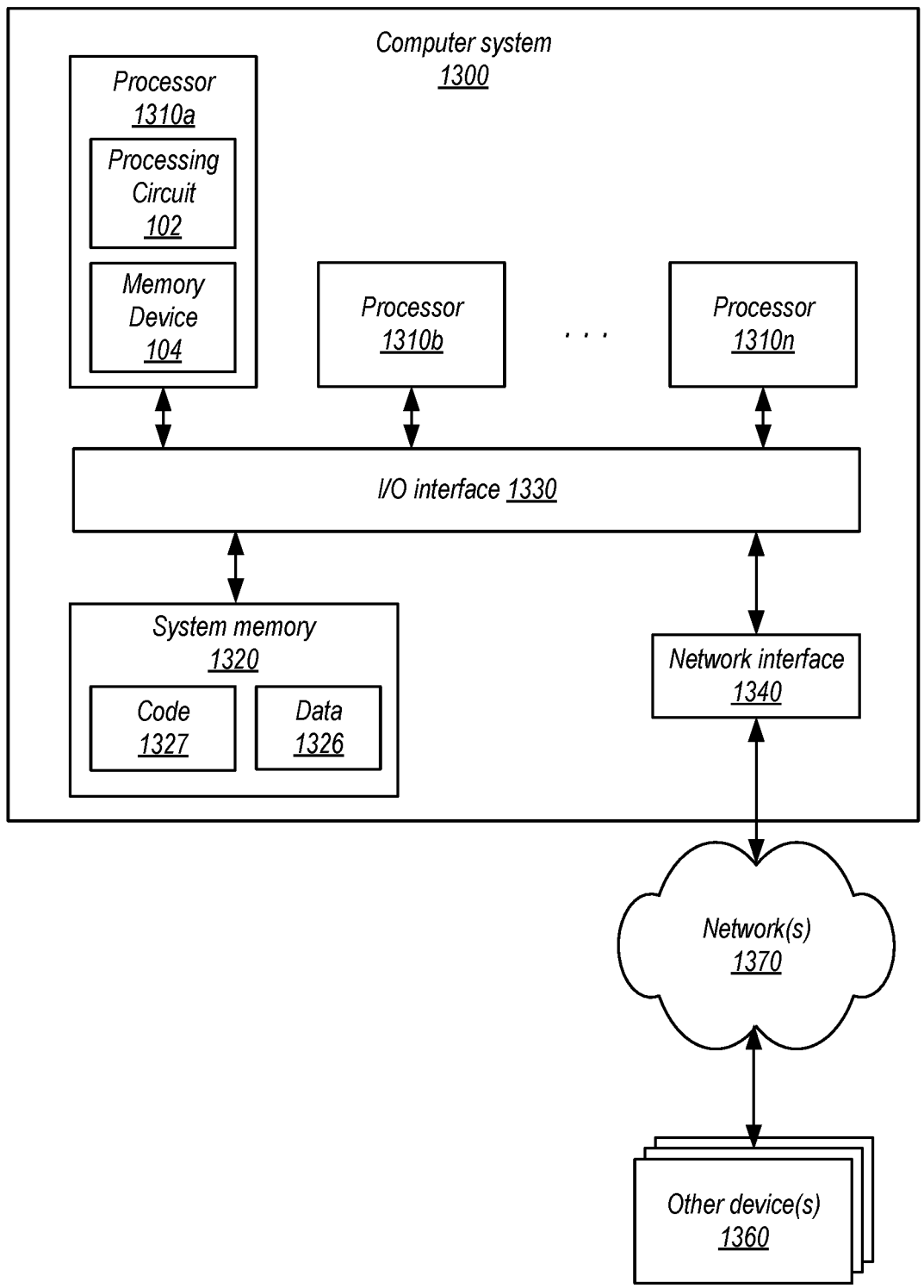
FIG. 13 is a block diagram illustrating an embodiment of an exemplary computing system that includes an initialization detection system.

One embodiment of a computer system configured to implement at least a portion of an initialization detection system such as initialization detection system 100 of FIG. 1 is shown in FIG. 13. In the illustrated embodiment, computer system 1300 includes one or more processors 1310a-n coupled to system memory 1320 via input/output (I/O) interface 1330. Computer system 1300 further includes network interface 1340 coupled to I/O interface 1330.

In various embodiments, computer system 1300 may be a uniprocessor system including one processor 1310a, or a multiprocessor system including several processors 1310a-n (e.g., two, four, eight, or another suitable number). Processors 1310a-n may be any suitable processors capable of executing instructions. For example, in various embodiments, processors 1310a-n may be general-purpose or embedded processors implementing any of a variety of instruction set architectures (ISAs), such as the x86, PowerPC, SPARC, or MIPS ISAs, or any other suitable ISA. In multiprocessor systems, each of processors 1310a-n may commonly, but not necessarily, implement the same ISA. One or more of processors 1310a-n may include at least a portion of an initialization detection system. For example, in the illustrated embodiment, processor 1310a includes processing circuit 102 and memory device 104 of FIG. 1. However, in other embodiments, other processors may additionally include respective processing circuits, respective memory devices, or both. Additionally, in some embodiments, memory device 104 may be instead included in one or more other devices (e.g., system memory 1320 or a peripheral device connected to network interface 1340).

System memory 1320 may be configured to store instructions and data accessible by processor(s) 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for memory initialization detection, are shown stored within system memory 1320 as code 1327 and data 1326. In some embodiments, system memory 1320 includes or corresponds to memory device 104 of FIG. 1. In some embodiments, memory device 104 caches data stored at system memory 1320.

In one embodiment, I/O interface 1330 is configured to coordinate I/O traffic between processors 1310a-n, system memory 1320, and any peripheral devices in the device, including network interface 1340 or other peripheral interfaces. In some embodiments, I/O interface 1330 performs protocols, timing or other data transformations to convert data signals from one component (e.g., system memory 1320) into a format suitable for use by another component (e.g., processor 1310a). I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments, some or all of the functionality of I/O interface 1330, such as an interface to system memory 1320, may be incorporated directly into a processor 1310.

Network interface 1340 may be configured to allow data to be exchanged between computer system 1300 and other devices 1360 attached to a network or networks 1370. In various embodiments, network interface 1340 may support communication via any suitable wired or wireless general data networks, such as types of Ethernet network, for example. Additionally, the network interface 1340 may support communication via telecommunications/telephony networks such as analog voice networks or digital fiber communications networks, via storage area networks such as Fibre Channel SANs, or via any other suitable type of network and/or protocol.

In some embodiments, the system memory 1320 may be one embodiment of a computer-accessible medium configured to store program instructions and data as described above for FIGS. 1 through 12 for operating an initialization detection system. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
   detecting, by a processing circuit, a write instruction of a program, wherein the write instruction addresses a particular memory location of a particular cache line of a memory cache, wherein the particular cache line includes:
      a plurality of memory locations that are grouped into a plurality of sections; and
      first metadata that indicates which of the plurality of sections store valid data of the program, wherein the first metadata is separate from the plurality of sections;
   determining, by the processing circuit based on the first metadata, that, prior to the write instruction updating the particular cache line, a section of the plurality of sections does not store valid data of the program, but instead stores second metadata having validity data that indicates which of the plurality of memory locations store valid data of the program, wherein the validity data indicates whether the particular memory location has been previously written to by the program;
   obtaining, by the processing circuit, the validity data from the section of the particular cache line; and
   determining, by the processing circuit based on the validity data and the particular memory location, whether to modify data stored within the section of the particular cache line.

2. The method of claim 1, further comprising modifying at least a portion of the data stored within the section of the particular cache line.

3. The method of claim 2, wherein modifying the at least a portion of the data comprises, in response to the validity data indicating that the data corresponding to the particular memory location does not store valid data of the program, updating the validity data corresponding to the particular memory location.

4. The method of claim 2, further comprising, in response to the validity data indicating that the data corresponding to the particular memory location does not store valid data of the program, updating second validity data corresponding to the particular memory location, wherein the second validity data is stored within a second section of the particular cache line.

5. The method of claim 4, wherein updating the second validity data comprises, in response to detecting that the section of the particular cache line includes data corresponding to the particular memory location:
   generating a copy of the validity data;
   generating an updated copy of the validity data by updating a portion of the copy of the validity data corresponding to the particular memory location; and
   writing the updated copy of the validity data to the second section of the particular cache line.

6. The method of claim 2, wherein the data corresponding to the particular memory location is cached within the section of the particular cache line, and wherein modifying the at least a portion of the data stored within the section of the particular cache line comprises:
   overwriting the data corresponding to the particular memory location with write data indicated by the write instruction; and
   updating the first metadata to indicate that the section of the particular cache line stores valid data of the program.

7. The method of claim 6, wherein, after updating the first metadata, the first metadata indicates that all sections of the particular cache line store valid data of the program.

8. The method of claim 1, wherein determining whether to modify the data stored within the section of the particular cache line comprises determining not to modify the data stored within the section of the particular cache line by:
   determining that the data corresponding to the particular memory location is not stored within the section of the particular cache line; and
   determining that the validity data indicates that a portion of the particular cache line that stores the data corresponding to the particular memory location stores valid data of the program.

9. A system, comprising:
   a memory device that includes a plurality of cache lines; and
   a processing circuit configured to:
      receive a write instruction that addresses a particular memory location, wherein data corresponding to the particular memory location is cached in a particular one of the plurality of cache lines, wherein the write instruction is associated with a program, and wherein the particular cache line includes:
         a plurality of memory locations that are grouped into a plurality of sections; and
         first metadata that indicates which of the plurality of sections store valid data of the program, wherein the first metadata is separate from the plurality of sections;
      subsequent to receiving the write instruction that addresses the particular memory location, determine, based on at least a portion of the first metadata, whether the particular cache line includes a section that does not store valid data of the program;
      in response to determining that a particular section of the cache line does not store valid data of the program, but instead stores second metadata having validity data indicating which of the plurality of memory locations store valid data of the program, wherein the validity data indicates whether the particular memory location has been previously written to by the program:
         request, from the memory device, the validity data from the particular section of the cache line; and
         determine, based on the validity data and the particular memory location, whether to modify data stored within the particular section of the cache line.

10. The system of claim 9, wherein the processing circuit is further configured to:

in response to determining to modify data stored within the particular section of the particular cache line, modify the validity data to indicate that the particular memory location stores valid data of the program.

11. The system of claim 10, wherein the determining to modify data stored within the particular section is based on the validity data indicating that the particular memory location does not store valid data of the program.

12. The system of claim 9, wherein the processing circuit is further configured to:
determine, based on the first metadata, whether another section of the particular cache line does not store valid data of the program; and
in response to the particular memory location being located within the particular section and determining that a second particular section does not store valid data of the program:
generate, based on the particular section, a copy of the validity data;
update the copy of the validity data to indicate that the particular memory location stores valid data of the program;
write the updated copy of the validity data to the second particular section; and
write data specified by the write instruction to the particular section.

13. The system of claim 9, wherein the processing circuit is further configured to:
overwrite the data corresponding to the particular memory location with write data that is indicated by the write instruction; and
update the first metadata to indicate that a section that includes the particular memory location stores valid data of the program, wherein updating the first metadata causes the first metadata to indicate that all sections of the particular cache line store valid data of the program.

14. The system of claim 13, wherein the processing circuit is further configured to:
determine, based on the first metadata indicating that all sections of the particular cache line store valid data of the program, to not modify data stored within the particular section of the particular cache line.

15. The system of claim 9, wherein the processing circuit is further configured to:
determine, based on the first metadata, all particular sections of the particular cache line that do not store valid data of the program, but instead store validity data; and
modify the validity data of all the particular sections to indicate that the particular memory location stores valid data of the program.

16. A method, comprising:
maintaining, by a computer system in a memory cache, a cache line associated with a program running on the computer system, wherein the cache line includes:
a plurality of sub-portions that are grouped into a plurality of sections; and
first metadata that indicates which of the plurality of sections stores valid data of the program, wherein the first metadata indicates that a particular one of the plurality of sections does not store valid data of the program, and wherein the first metadata is separate from the plurality of sections;
storing, by the computer system in the particular section of the cache line, second metadata having validity data indicating which sub-portions of the plurality of sections store valid data of the program;
detecting, by the computer system, a write instruction of the program, wherein processing the write instruction causes valid data of the program to be written to a particular sub-portion of the cache line; and
updating, by the computer system, the first metadata, the second metadata, or both based on valid data of the program being written to the particular sub-portion.

17. The method of claim 16, further comprising:
detecting, by the computer system, a read instruction of the program, wherein the read instruction addresses a second particular sub-portion of the cache line;
obtaining, by the computer system based on the first metadata, the validity data stored in the particular section of the cache line; and
determining, by the computer system, whether the read instruction is to be prevented from proceeding such that data corresponding to the second particular sub-portion is not included in a response to the read instruction, wherein the determining is based on whether the validity data indicates that the second particular sub-portion stores valid data of the program.

18. The method of claim 16, wherein, in response to the validity data indicating, prior to the write instruction, that the particular sub-portion does not store valid data of the program, updating the validity data to indicate the particular sub-portion stores valid data of the program.

19. The method of claim 16, wherein, in response to the first metadata indicating, prior to the write instruction, that a section of the cache line that includes the particular sub-portion does not store valid data of the program, updating the first metadata to indicate that the section stores valid data of the program.

* * * * *